United States Patent
Ge et al.

(10) Patent No.: US 10,576,748 B2
(45) Date of Patent: Mar. 3, 2020

(54) FLUID RESERVOIR WITH FLUID PROPERTY AND LEVEL DETECTION

(71) Applicant: HEWLETT-PACKARD DEVELOPMENT COMPANY, L.P., Spring, TX (US)

(72) Inventors: Ning Ge, Palo Alto, CA (US); Chien-Hua Chen, Corvallis, OR (US); Michael W. Cumbie, Corvallis, OR (US)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 16/317,362

(22) PCT Filed: Oct. 7, 2016

(86) PCT No.: PCT/US2016/055917
§ 371 (c)(1),
(2) Date: Jan. 11, 2019

(87) PCT Pub. No.: WO2018/067169
PCT Pub. Date: Apr. 12, 2018

(65) Prior Publication Data
US 2019/0240985 A1 Aug. 8, 2019

(51) Int. Cl.
*B41J 2/175* (2006.01)
*B41J 2/195* (2006.01)
(Continued)

(52) U.S. Cl.
CPC .......... *B41J 2/17566* (2013.01); *B41J 2/195* (2013.01); *G01F 23/242* (2013.01);
(Continued)

(58) Field of Classification Search
CPC ............... B41J 2/17566; B41J 2/195; B41J 2002/17579; G01F 23/242; G01F 23/243; G01F 23/0061
See application file for complete search history.

(56) References Cited

U.S. PATENT DOCUMENTS

| 5,623,291 A | 4/1997 | Morandotti et al. |
| 6,007,173 A | 12/1999 | Delouise |

(Continued)

FOREIGN PATENT DOCUMENTS

| EP | 1013426 A2 | 6/2000 |
| EP | 3012602 A1 | 4/2016 |
| WO | WO-9300573 A1 | 1/1993 |

OTHER PUBLICATIONS

Paczesny, D. et al; "The Capacitive Sensor for Liquid Level Measurement Made with Ink-jet Printing Technology"; 2015; http://www.sciencedirect.com/science/article/pii/S187770581502439X.

*Primary Examiner* — Julian D Huffman
(74) *Attorney, Agent, or Firm* — Fabian VanCott

(57) ABSTRACT

A fluid reservoir (101) includes a number of electrode pairs disposed within the fluid reservoir. Each of the electrode pairs includes a number of sensing electrodes (103), and a number of electrical traces (105) wherein the sensing electrodes are coupled to a respective one of the electrical traces. The fluid reservoir also includes a common electrode (104) electrically coupled to a voltage source (106). A number of properties of a fluid (110) within the fluid reservoir are detected by applying a voltage between the sensing electrodes in an electrode pair, and a level of the fluid within the fluid reservoir is detected by applying a voltage between the electrodes and the common electrode. A multiplexer (102) may be used to selectively couple the sensing electrodes (103) to a processing device (108). The fluid reservoir may be a printing fluid container.

13 Claims, 5 Drawing Sheets

(51) Int. Cl.
*G01F 23/24* (2006.01)
*G01F 23/00* (2006.01)

(52) U.S. Cl.
CPC ... *G01F 23/243* (2013.01); *B41J 2002/17579* (2013.01); *G01F 23/0061* (2013.01)

(56) References Cited

U.S. PATENT DOCUMENTS

| | | | |
|---|---|---|---|
| 6,109,714 | A | 8/2000 | Tsuruoka |
| 6,431,670 | B1 | 8/2002 | Schantz et al. |
| 6,631,970 | B2 | 10/2003 | Sato et al. |
| 7,568,389 | B2 | 8/2009 | Eguchi et al. |
| 2007/0013752 | A1* | 1/2007 | Wilson ............... B41J 2/17509 347/85 |
| 2009/0015622 | A1 | 1/2009 | Karaki et al. |
| 2010/0295565 | A1 | 11/2010 | Drack |
| 2011/0048126 | A1 | 3/2011 | Adler |
| 2013/0293624 | A1* | 11/2013 | Lester ............... B41J 2/17513 347/19 |
| 2016/0114590 | A1* | 4/2016 | Arpin ............... B41J 2/175 347/7 |

\* cited by examiner

FLUID RESERVOIR WITH FLUID PROPERTY AND LEVEL DETECTION

BACKGROUND

Printing devices eject printable fluid onto print media in order to form an image or a structure on the print media. The printable fluid may be stored in a reservoir or other volume from which a printing device draws the printable fluid. Over time, the level or amount of printable fluid within the reservoir is depleted.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

Figure 1:
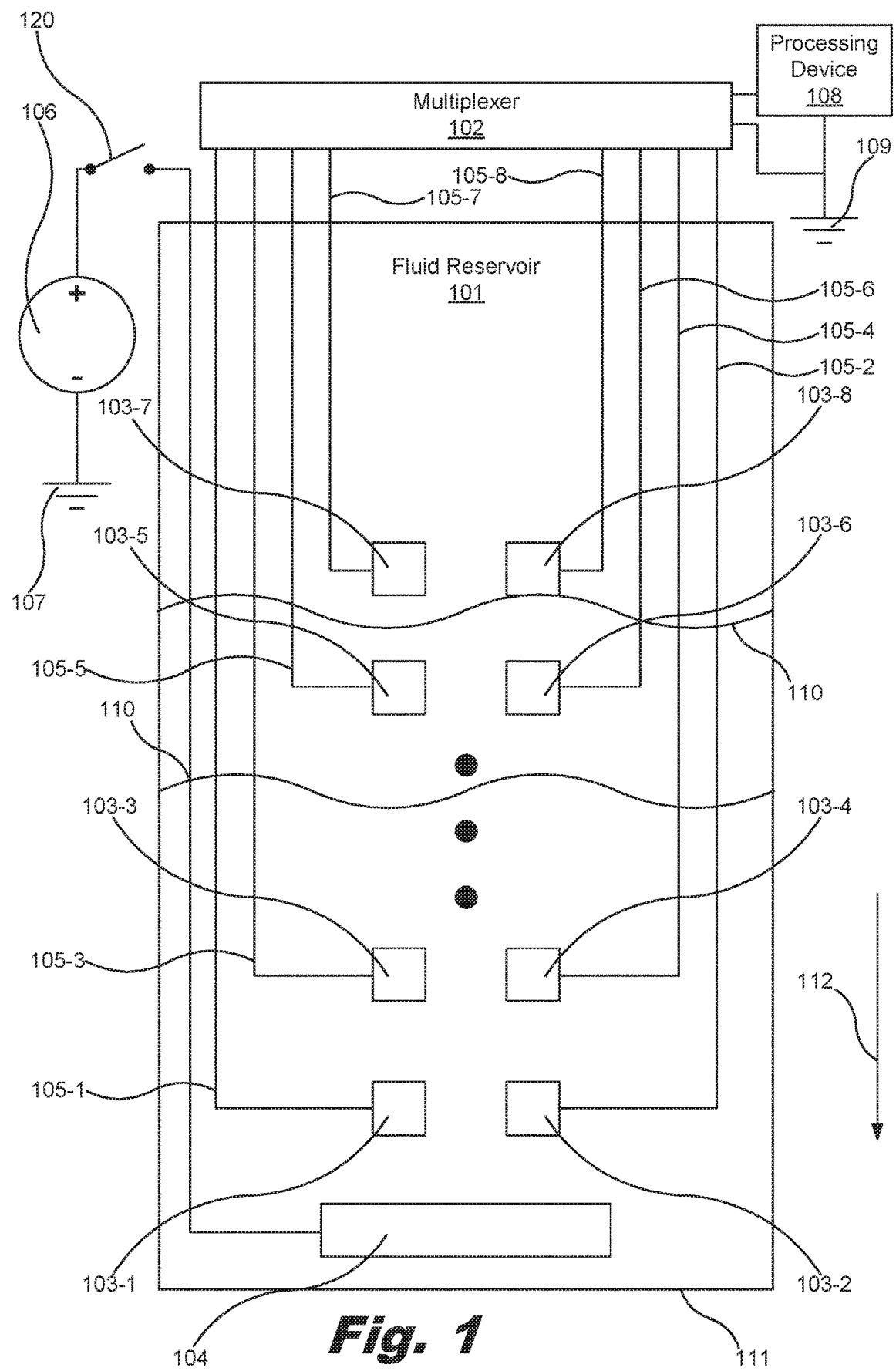
FIG. 1 is a diagram of a fluid reservoir, according to one example of the principles described herein.

As mentioned above, over time, the level or amount of printable fluid within the reservoir is depleted as the printing device utilizes the printable fluid. A number of devices may be used to sense and determine the level or amount of printable fluid within the reservoir of printable fluid. In some examples, the devices used to sense and determine the amount of printable fluid within the reservoir may be complex and expensive to manufacture.

False printable fluid levels or inaccurate readouts causes consumers of printable fluid devices to be dissatisfied with such a product. More reliable and accurate fluid level sensors may cause a consumer base to have a better user experience.

Further, it may be beneficial to be able to determine the properties of fluids such as printable fluids within a fluid reservoir. In some instances, users may recycle print fluid cartridges by refilling the print fluid cartridges, and using those cartridges in a printing device. While this is may be good for the environment, non-conforming inks may be used in the print fluid cartridges which may cause issues with the printing device, create an inferior printed document or object, or result in other types of issues.

Examples described herein provide a fluid reservoir. The fluid reservoir includes a number of electrode pairs disposed within the fluid reservoir. Each of the electrode pairs includes a number of sensing electrodes, and a number of electrical traces wherein the sensing electrodes are coupled to a respective one of the electrical traces. The fluid reservoir also includes a common electrode electrically coupled to a voltage source. A number of properties of a fluid within the fluid reservoir are detected by applying a voltage between the sensing electrodes in an electrode pair, and a level of the fluid within the fluid reservoir is detected by applying a voltage between the electrodes and the common electrode.

The fluid reservoir may further include a signal processing device to process signals resulting from the voltage between the sensing electrodes in the electrode pair with the multiplexer in the first state to determine the properties of the fluid, and to process signals resulting from the voltage between the electrodes and the common electrode with the multiplexer in the second state to determine the level of the fluid within the fluid reservoir. The fluid reservoir includes an array of the electrode pairs including a plurality of the electrode pairs. A location of the number of electrode pairs within the fluid reservoir define a corresponding number of levels of fluid within the fluid reservoir. Further, a positioning of the number of electrode pairs within the array of electrode pairs defines a granularity of fluid level detection. In one example, the sensing electrodes, the common electrode, and the electrical traces are integrated into a housing of the fluid reservoir.

Examples described herein also provide a fluid analysis system. The fluid analysis system includes an electrode array disposed along a gravitationally oriented side of a fluid reservoir. The electrode array includes a number of sensing electrodes electrically arranged in pairs along the side of the fluid reservoir. Each pair of sensing electrodes is located at a number of discrete fluid levels within the fluid reservoir. A common electrode may be coupled to a voltage source and located below the sensing electrodes. A multiplexer is electrically coupled to each of the sensing electrodes via a number of electrical traces. A signal processing device to process signals received by the electrodes via the multiplexer may be included. A number of properties of a fluid within the fluid reservoir are detected by applying a voltage between the sensing electrodes of at least one of the electrode pairs with the multiplexer in a first state. Further, a level of the fluid within the fluid reservoir is detected by applying a voltage between the sensing electrodes and the common electrode with the multiplexer in a second state.

Applying the voltage between the sensing electrodes of at least one of the electrode pairs creates an electrical field between the at least one electrode pair to detect the properties of the fluid via electrophoresis. The signal processing device processes the signals received by the sensing electrodes based on the state of the multiplexer. Further, a location of the number of sensing electrode pairs within the reservoir define a corresponding number of levels of fluid within the fluid reservoir. Still further, the number of sensing electrodes pairs within the electrode array defines a granularity of fluid level detection.

In one example, the sensing electrodes, the common electrode, and the electrical traces are integrated into the fluid reservoir using a laser direct structuring process. In another example, the sensing electrodes, the common electrode, and the electrical traces are integrated into the fluid reservoir using a three-dimensional printing process.

Examples described herein also provide a printing fluid container. The printing fluid container includes a voltage source, a common electrode coupled to the voltage source, and an electrode array disposed along a gravitationally oriented side of a fluid reservoir. The electrode array includes a number of sensing electrodes electrically arranged in pairs along the side of the fluid reservoir. Each pair of sensing electrodes is located at a number of discrete fluid levels within the fluid reservoir. A multiplexer may be electrically coupled to each of the sensing electrodes. Further, a signal processing device may be coupled to the multiplexer to process signals received by the electrodes via the multiplexer. A number of properties of a fluid within the printing fluid container are detected by applying a voltage between at least one pair of sensing electrodes with the multiplexer in a first state to form a number of electrical fields between the at least one pair of sensing electrodes. Further, a level of the fluid within the fluid reservoir is detected by applying a voltage between the sensing electrodes and the common electrode with the multiplexer in a second state.

Even still further, as used in the present specification and in the appended claims, the term "a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Turning now to the figures, FIG. 1 is a diagram of a fluid reservoir (101), according to one example of the principles described herein. In one example, the fluid reservoir (101) may include a container for a printing fluid. In another example, the fluid reservoir (101) may include a portion of a printing pen or printhead in which the fluid is contained. The printable fluid may include any fluid that may be printed including, for example, an ink, a pigment ink, a dye ink, a metal particle ink (eg. Ag ink), a pharmaceutical, or other printable fluid. The printing fluid may also include materials used in a three-dimensional (3D) printing device such as, for example, a metal, a polymer, a curing agent, a composite, or any other 3D printing material.

The fluid reservoir (101) includes a number of sensing electrodes (103-1, 103-2, 103-3, 103-4, 103-5, 103-6, 103-7, 103-8, collectively referred to herein as (103) arranged along a length of the fluid reservoir (101). In one example, the electrodes (103) are arranged in pairs such that the two electrodes within a pair are arranged horizontally along a height of the fluid reservoir (101) with respect to one another. For example, electrode (103-1) is positioned on the same horizontal plane as electrode (103-2), electrode (103-3) is positioned on the same horizontal plane as electrode (103-4), electrode (103-5) is positioned on the same horizontal plane as electrode (103-6), and electrode (103-7) is positioned on the same horizontal plane as electrode (103-8). Although eight electrodes (103) are depicted in Figures, any number of electrodes (103) may be included in the fluid reservoir (101) as indicated by the ellipses. In one example, tens, hundreds, or thousands of electrodes may be arranged within the fluid reservoir (101).

The electrodes (103) form an electrode array disposed along a gravitationally oriented side of the fluid reservoir (101) with arrow (112) indicating the direction of the force of gravity. In this manner, the fluid (110) disposed within the fluid reservoir (101) is drawn to the bottom (111) of the fluid reservoir (101), and the level of the fluid (110) within the fluid reservoir (101) and the properties of the fluid (110) may be detected. The electrodes (103) are sensing electrodes that detect resistances and inductances within the fluid (110) at discrete levels of the fluid (110) since the electrodes (103) are located at discrete levels within the fluid reservoir (101).

A number of electrical traces (105-1, 105-2, 105-3, 105-4, 105-5, 105-6, 105-7, 105-8, collectively referred to herein as 105) are coupled to each electrode (103) with one electrical trace (105) per electrode (103). The electrical traces (105) electrically couple the electrodes (103) to processing devices such as, for example, a multiplexer (102), a processing device (108), an analog-to-digital converter (ADC), an application specific integrated circuit (ASIC), another data processing device, ground (109), or other electrical or electronic elements or devices. With this connection, signals received by the electrodes (103) may be passed onto other devices for processing.

A common electrode (104) may also be included within the fluid reservoir (101). The common electrode (104) is located below the array of electrodes (103). Although the common electrode (104) is depicted as being located juxtaposition to the sensing electrodes (103), the common electrode (104) may be located anywhere below the array of sensing electrode (103). In one example, the common electrode (104) may be located near the bottom in order to detect a lowest fluid level of the fluid within the fluid reservoir (101). In one example, the common electrode (104) may be located at a bottom (111) of the fluid reservoir (101). In another example, the common electrode (104) may be located at a bottom of a side of the fluid reservoir (101) next to or abutting the bottom (111) of the fluid reservoir (101).

In one example, the electrodes (103), the common electrode (104), and the electrical traces (105) may be disposed within (101) and coupled to a wall of the fluid reservoir (101) through a molded interconnect device (MID) manufacturing process. An MID an injection-molded thermoplastic part with integrated electronic elements. An MID combines a plastic substrate or housing with circuitry into a single part through selective metallization. In one example, the selective metallization process may include a laser direct structuring (LDS) process. An LDS process forms a substrate or housing such as the fluid reservoir (101) with a thermoplastic material that has been doped with a metal-plastic additive. Using the LDS process, the metal-plastic additive is activated using a laser device. The laser device writes the course and positions of the electrodes (103), the common electrode (104), and the electrical traces (105) on the metal-plastic additive-doped thermoplastic material. Where the laser beam hits the plastic the metal additive forms a micro-rough track. The metal particles of this track form the nuclei for a subsequent metallization process in which a metal adheres to those portions of the fluid reservoir (101) hit by the laser. In one example, the LDS process may be the LDS process developed by LPKF Laser & Electronics AG. In another example, the LDS process may be the LDS process developed by Hitachi Maxell, Ltd.

In another example, a similar process may be used where the fluid reservoir (101) is molded, and an electroplating seed layer is activated with the laser. The fluid reservoir (101) may be subjected to an electrode plating process and a surface finish process. Even though an MID LDS process has been described herein as a process by which the sensing electrodes (103), the common electrode (104), and the electrical traces (105) may be disposed within (101) and coupled to a wall of the fluid reservoir (101), any process may be employed in forming these elements in or onto the fluid reservoir (101). The MID LDS processes described above provide for an injection molded fluid reservoir (101) that is manufactured in a less expensive and more precise manner providing, for example, conductor paths and elements with a diameter of less than 80 μm.

In another example, a three-dimensional (3D) printing process may be used to form the sensing electrodes (103), the common electrode (104), and the electrical traces (105) on an interior of the fluid reservoir (101). In still another example, a vapor deposition process may be used to form the sensing electrodes (103), the common electrode (104), and the electrical traces (05) on an interior of the fluid reservoir (101).

The common electrode (104) is coupled to a power supply (106). The power supply (106) serves as a current and voltage supply and may provide, for example, 15 volts (V) or 30 V. In one example, the power supply (106) is a direct current (DC) power supply. The power supply (106) is coupled to ground. In one example, in order to allow for intermittent application of a voltage to the common electrode (104), a switch (120) may be included between the power supply (106) and the common electrode (104). The switch (120), when closed, causes a voltage to be application to the common electrode (104), and may be closed during a measurement of the level or properties of the fluid (110), and open when no measurements are being performed. In another example, a switch (120) may not be included, and, instead, the power supply (106) may provide a pulse voltage.

The electrical traces (105) maybe coupled to a multiplexer (102). The multiplexer (102) may be any device that selects one of several analog or digital input signals, and forwards the selected input into a single line. The multiplexer (102) includes $2^n$ inputs with n select lines that are used to select which input line to send to an output. In one example, the multiplexer (102) may output the signal to a processing device (108) to allow the signals received from the electrodes (103) to be processed. The processing device (108) may include, for example, an ADC, an ASIC, a field programmable gate array (FPGA), a graphics processing unit (GPU), another data processing device, other signal or data processing device, or combinations thereof. The multiplexer (102) may also be coupled to ground (109) in order to allow a number of signals from the electrodes (103) to be grounded for determining the properties of the fluid within the fluid reservoir (101) as will be described in more detail below.

Figure 2:
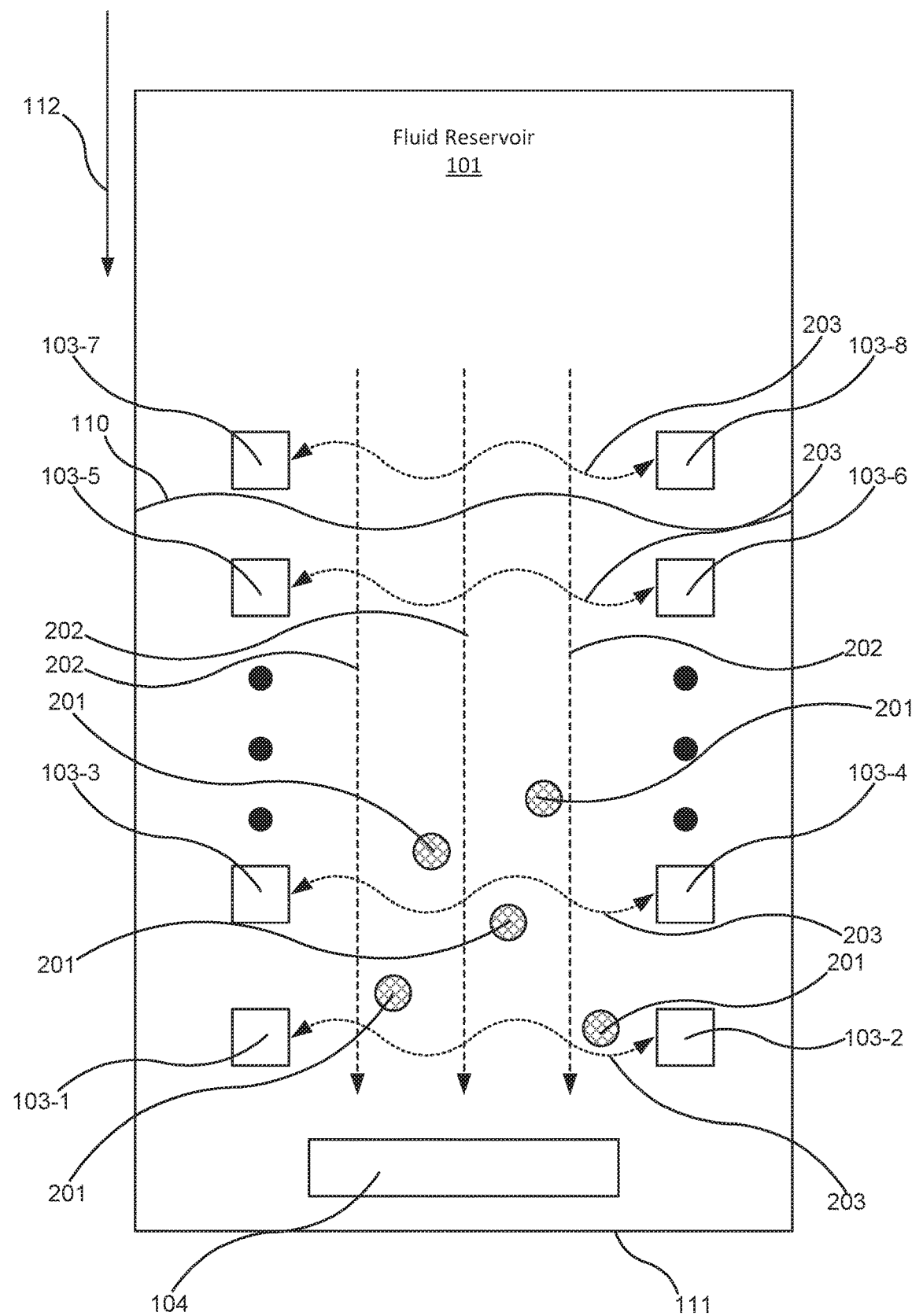
FIG. 2 is a diagram of the fluid reservoir of FIG. 1 during a fluid analysis process, according to one example of the principles described herein.

FIG. 2 is a diagram of the fluid reservoir (101) of FIG. 1 during a fluid analysis process, according to one example of the principles described herein. The fluid reservoir (101) and its various elements are used to determine both the amount or level of fluid (110) within the fluid reservoir (101) as well as the properties of the fluid (110). The properties of the fluid (110) may include a particle concentration within the fluid (110), an ion species within the fluid (110), resistive properties of the fluid (110), inductive properties of the fluid (110), other properties of the fluid, or combinations thereof. Detection of these properties may be used to identify whether the fluid is of one type of another.

For example, the fluid (110), may be an ink. In this example, the properties detected are used by the multiplexer (102) and processing device (108) to determine whether the ink is a pigment-based ink or a dye-based ink, the pigment particle concentration of pigments within a pigment-based ink, ion species within a pigment-based ink and concentration of dye-based ink. As to pigment inks, a surfactant may be included. The surfactant within the pigment ink is used to ensure no settling of, for example, pigment particles, occurs. As will be described in more detail below, however, a localized concentration of pigment particles may be effected by the application of an electrical filed to the ink. Each ink or other fluid (110) may then be identified by its unique combination of ion species, concentrations, pH levels, and other properties that define its electrical impedance spectrum. An electrical impedance spectrum of a given fluid may uniquely identify the fluid such as an ink much like a fingerprint for the fluid. In fact, an electrical impedance spectrum may even be used to identify a source or brand of the fluid since each manufacturer of a chemical fluid may create different formulations of what may be perceived as similar fluids. This electrical impedance spectrum may then be used by the multiplexer (102) and the processing device (108) to identify the type of fluid (110) within the fluid reservoir (101).

Figure 3:
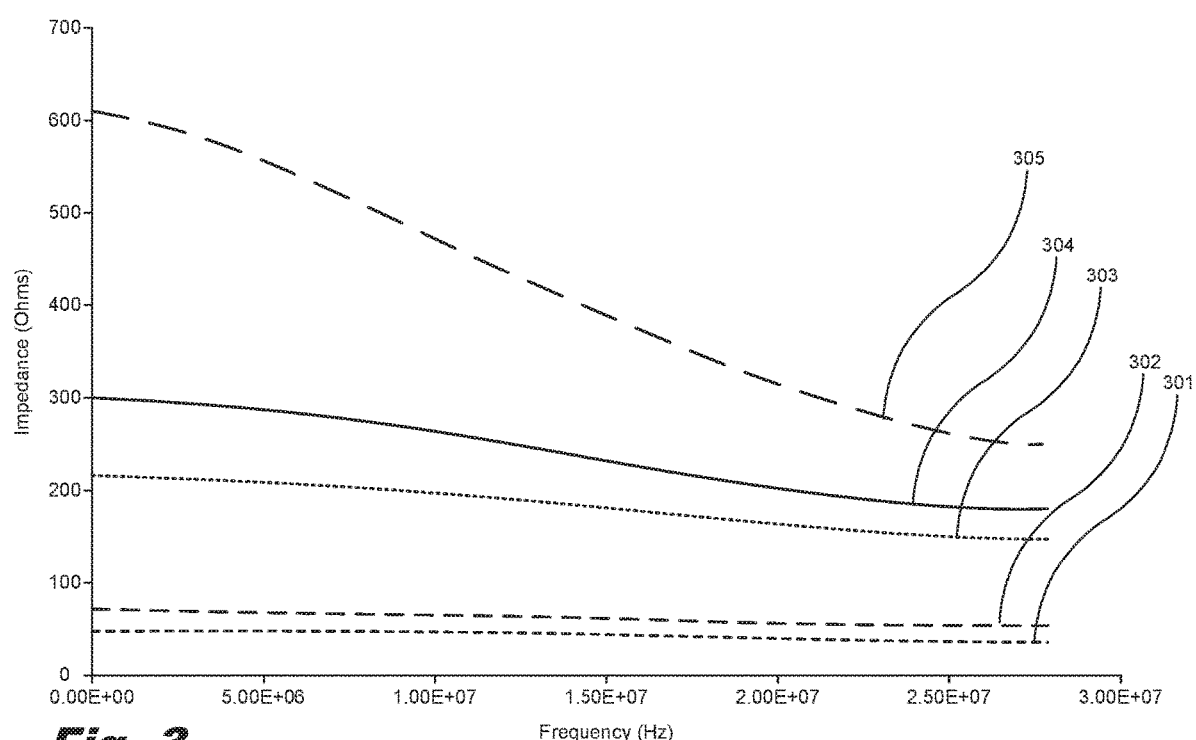
FIG. 3 is a chart depicting an electrical impedance spectrum of a number of fluids, according to one example of the principles described herein.

The electrical impedance spectrum may be understood more fully with reference to FIG. 3. FIG. 3 is a chart depicting electrical impedance spectrums (301, 302, 303, 304, 305) of a number of fluids (110), according to one example of the principles described herein. The impedance of the fluids (110) are depicted as a function of frequency. In the example of FIG. 3, the electrical impedance spectrums (301, 302, 303, 304, 305) depicted represent inks. The electrical impedance spectrum identified by lines (301, 302) are electrical impedance spectrums for two different dye-based inks, and the electrical impedance spectrum identified by lines (303, 304, 305) are electrical impedance spectrums for pigment-based inks. As to the dye-based inks represented by lines (301, 302), a distinguished difference in resistance or impedance may be identified in order to distinguish between different dye-based inks due to differences in, for example, pH levels between different dye-based inks. Further, at 0 hertz (H), the difference between resistance or impedance between the individual dye-based inks, between the individual pigment-based inks, and between the dye-based inks and the pigment-based inks may be distinguished. Thus, based on the resistive differences between different types of fluids (110), the resistance may be measured by measuring the fluid path resistance between sensing electrodes (103) with a given pair of sensing electrodes. In one example, the sensing electrodes (103) may be directly exposed to the fluid (110) being sensed. In another example, the sensing electrodes (103) may indirectly sense the properties of the fluid (110). FIG. 3 is an example of electrical impedance spectrums (301, 302, 303, 304, 305) of a number of fluids (110) along a range of frequencies and as obtained from an LCR meter. However, and more refined and detailed electrical impedance spectrum may be obtained through using a more precise LCR meter and by considering different ranges of frequencies.

With reference again to FIG. 2, and in order to obtain an electrical impedance spectrum of the fluid (110) within the fluid reservoir (101), a positive voltage potential is applied to the common electrode (104). The positive voltage applied to the common electrode (104) causes negatively-charged pigment particles (201) to be attracted to the common electrode (104) as indicated by arrows (202). This movement of negatively-charged pigment particles (201) within the fluid (110) is referred to as electrophoresis. Electrophoresis is an electrokinetic phenomenon that deals with the motion of dispersed particles relative to a fluid under the influence of a spatially uniform electric field. The application of a constant electric field causes particles dispersed in a fluid to migrate. As used herein, this electrophoresis process is caused by the presence of a charged interface between the particle surface of the pigment particles (201) and the surrounding fluid (110). Electrophoresis, in the examples described herein, is used to separate molecules by size, charge, or binding affinity, for example.

With this understanding of electrophoresis, the different pigment-based inks (110) that may be included within the fluid reservoir (101) may include different and unique types of pigment particles that have differing masses, sizes, and charges. Each of these different types of pigment particles carries a respective negative charge that may be referred to as a Zeta potential in order to maintain the pigment particle suspended within the pigment ink solution. The Zeta potential ($\zeta$-potential) may also be referred to as an electrokinetic potential, and is the electric potential in the interfacial double layer at the location of a slipping plane relative to a point in the fluid (110) away from the interface. The $\zeta$-potential is the potential difference between the dispersion medium of the pigment ink solution and the stationary layer of fluid attached to the dispersed pigment particle (201). The present fluid reservoir (101) utilizes the $\zeta$-potential as a unique property to sense a localized resistance path through the attraction of the pigment particles (201) to the common electrode (104) as indicated by arrows (202).

An electrical field (203) is formed by applying a voltage between the sensing electrodes (103) of each of the sensing electrode pairs. The particle concentration is detected by the sensing electrode pairs at their respective discrete levels within the fluid reservoir (101) by detecting the resistance between the sensing electrodes (103) of the sensing electrode pairs. For example, the particle concentration is detected between sensing electrode (103-1) and sensing electrode (103-2) by detecting the resistance between sensing electrode (103-1) and sensing electrode (103-2). The same occurs between all pairs of sensing electrodes (103). At each discrete level of the sensing electrode (103) array, different concentrations of the negatively charge pigment particles (201) may be detected. The resistances at the discrete levels of sensing electrodes (103), and the resulting electrical impedance spectrum are used by the multiplexer (102) and the processing device (108) to identify the type of fluid (110) within the fluid reservoir (101). The localized resistance paths of the electrical fields (203) formed between sensing electrode (103) pairs and as effected by the attraction of the negatively-charged pigment particles (201) to the common electrode (104) as indicated by arrows (202) increases the sensitivity of the detection of the pigment particles (201). In other words, due to the pigment particles (201) being driven to the common electrode (104), the electrical impedance or resistance changes at the various levels of the fluid (110) such that the impedance or resistance is lower closer to the common electrode (104) due to the increase of density of the pigment particles (104). Because each pigment-based ink has differing amounts and kinds of pigment particles (201), a localized impedance or resistance path between each of the individual pairs of sensing electrodes (103) is different. This creates a unique impedance or resistance spectrum for each ink or fluid within the fluid reservoir (101) that is identifiable.

In one example, a fluid property sensing process may be implemented when the fluid reservoir (101) is coupled to an electronic device. In one example, the electronic device may be a printing device, and the fluid reservoir (101) may be used as an ink source for a number of printheads. In this example, when the fluid reservoir (101) is coupled to the printing device, a number of processing devices (108) within the printing device may cause the fluid property sensing process to execute so that a larger number of sensing electrode (103) pairs may participate in the fluid property sensing process. In another example, the fluid property sensing process may be executed at any time, and at whatever fluid level of the fluid reservoir (101). In one example, a calibration process may be evoked to account for any timing from the activation of the common electrode (104) and the sensing electrodes (103), as well as any timing between activation of a first sensing electrode pair and a second electrode pair.

Further, a calibration process may be evoked in order to account for different properties of different fluids (110) so that the signals obtained from the fluid reservoir (101) may be adjusted based on, for example, whether the fluid (110) is a dye-based ink, a pigment-based ink, and the numerous differences between these types of fluids. This type of calibration may ensure that even if counterfeit inks are used to replenish the fluid (110) within the fluid reservoir (101), the fluid level and properties may be properly detected and an operation such as a print job, in the case of a print fluid reservoir, is processed in an effective manner despite the presence of a non-standard ink. For example, in some printing devices, a printable fluid such as an ink may be specified for use in those printing devices, specifically, since that particular ink is formulated for that specific printing device. Use of a counterfeit or non-specified ink may negatively affect the operation or performance of printheads within the printing device since the properties of the ink are formulated to work within those particular printheads. Further, detection and calibration of out-of-warranty fluids within the fluid reservoir (101) or fluids (110) that have been subjected to temperatures or other environmental influences that destroy a number of properties of the ink will ensure that the highest quality of fluid is present in the fluid reservoir (101).

Turning again to FIG. 1, the fluid reservoir (101) may also be used to detect a level of fluid (110) within the fluid reservoir (101), as mentioned above. In one example, the level of the fluid (110) is detected by detecting a resistance between a given sensing electrode (103) and the common electrode (104). In this example, a voltage is applied at the common electrode (104) via the power supply (106). The sensing electrodes (103) sense a resistance or conductance based on whether the sensing electrode (103) is in contact with the fluid (110) or not. Because the fluid (110) and air have different resistances or conductance levels with respect to the sensing electrodes (103), the multiplexer (102) and processing device (108) may use the different resistances or conductance levels to determine the level of the fluid (110). For example, if the fluid (110) is at a level between electrodes (103-3, 103-4) and electrodes (103-5, 103-6), then the resistivity and conductance levels obtained from electrodes (103-3, 103-4) will be different from those obtained from electrodes (103-5, 103-6).

In another example, the level of the fluid (110) may be detected by detecting an impedance value between electrical traces (105). In this example, a full range of fluid (110) levels may be detected with a high degree of resolution. In detecting the impedance value between electrical traces (105) a sense signal may be selectively applied to first one of the electrical traces (105) such as, for example, electrical trace (105-1) defined on an interior surface of the fluid reservoir (101). In one example, the sense signal may be provided to the electrical trace (105-1) using a power supply which may provide either an AC or DC signal. A second electrical trace (105) such as electrical trace (105-6) may sense for a voltage indicating the resistance or impedance of the printing fluid between the two electrical traces (105-1, 105-6). The detected sense signal may be sent to the processing device (108) for processing and interpretation of the sensed signal into a fluid level.

In some situations, the fluid (110) may interact with the interior surfaces of the fluid reservoir (101) that causes a concave or convex meniscus to form along the interior surfaces of the fluid reservoir (101) through capillary forces. A convex meniscus occurs when the particles in the fluid (110) have a stronger attraction to each other than to the material of the fluid reservoir (101). Conversely, a concave meniscus occurs when the particles of the fluid (110) are more strongly attracted to the fluid reservoir (101) than to each other, causing the liquid to climb the walls of the fluid reservoir (101). A meniscus formed in the fluid reservoir (101) may cause an inaccurate level of fluid (110) to be detected. In order to overcome the potential for an inaccurate reading with respect the fluid level, a first one of the sensing electrodes (103) in a sensing electrode pair may be checked against a second one of the sensing electrodes (103) in the sensing electrode pair. For example, if a meniscus forms around sensing electrode (103-3), then an inaccurate reading may result when sensing electrode (103-3) is subjected to the effects of a meniscus. Thus, the signal from sensing electrode (103-3) is checked against a reading received from sensing electrode (103-4). The multiplexer (102) and processing device (108) are able to rectify differences in fluid level readings between sensing electrode pairs, account for a meniscus formed in the fluid reservoir (101), and report an accurate fluid level to, for example, an electronic device associated with the fluid reservoir (101).

In another example, a potential meniscus issue may be rectified by sending a signal between two sensing electrodes (103) within a given pair. In some situations, a meniscus of fluid (103) may cover one of the two sensing electrodes (103) within a pair, while the other of the two sensing electrodes (103) is not covered, and the actual level of the fluid (110) is below the level of the pair of electrodes. In this example, a signal may be sent between the two sensing electrodes (103) within the pair to detect a resistance or conductance. Depending on these measurements, the system can determine if a meniscus is present at a given level of the fluid reservoir (101). In one example, a level of the fluid (110) may be determined using the sensing electrodes (103) and the common electrode (104) along a vertical orientation of the fluid reservoir (101), and the level of the fluid (110) may be confirmed using the sensing electrodes (103) along a horizontal orientation of the fluid reservoir (101) between sensing electrodes (103) of the sensing electrode pairs.

Figure 4:
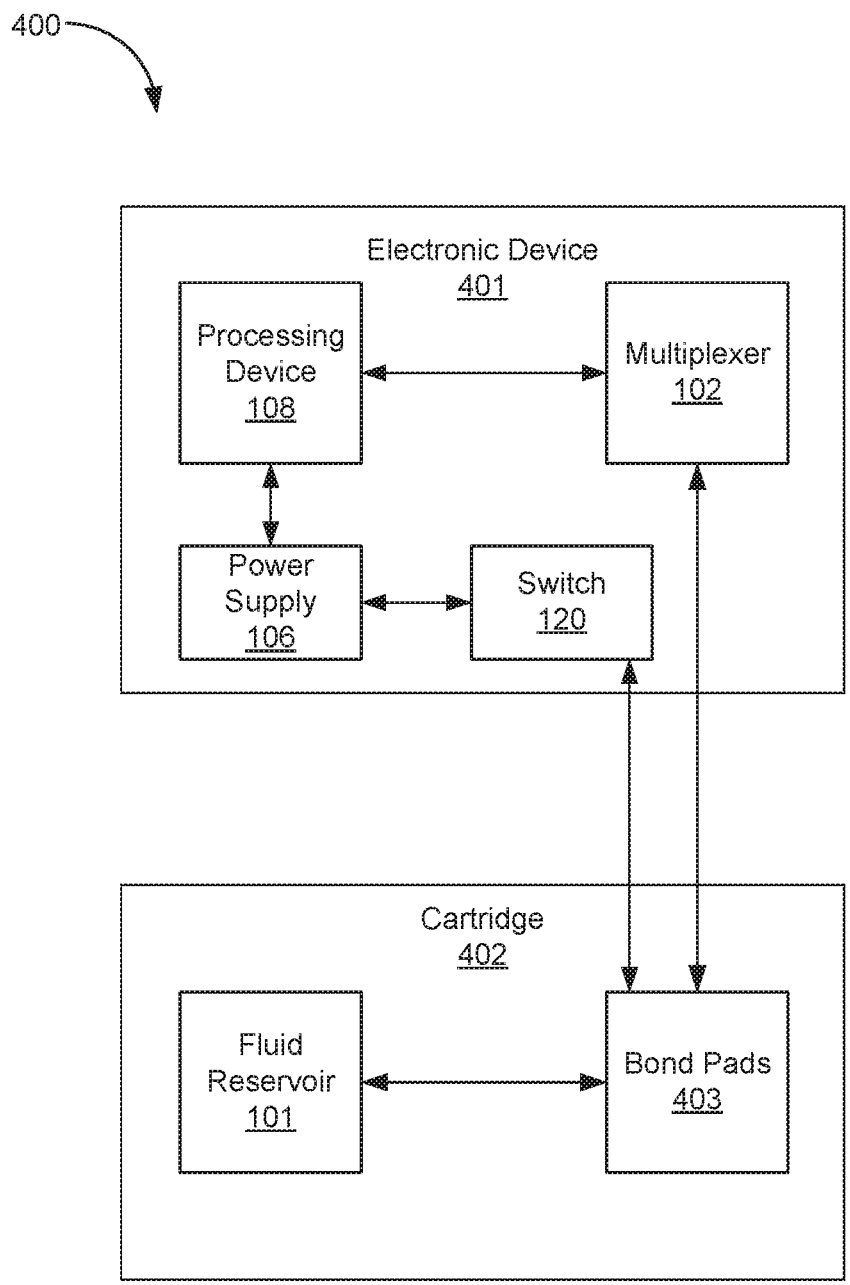
FIG. 4 is a block diagram of a fluid analysis system including the fluid reservoir of FIG. 1, according to one example of the principles described herein.

FIG. 4 is a block diagram of a fluid analysis system (400) including the fluid reservoir (101) of FIG. 1, according to one example of the principles described herein. As mentioned herein, the fluid reservoir (101) may be embodied in a cartridge (402), and that cartridge (401) may be coupled to an electronic device (401). In one example, the cartridge (402) may be an inkjet print cartridge, a printing pen, a printing fluid supply cartridge that supplies printing fluid such as, for example, ink, to a number of printheads, or another component associated with a printing device. In this example, the electronic device (401) may be a printing device that controls a number of printheads during a printing process.

As depicted in FIG. 4, the cartridge (402) may include the print reservoir (101) and a number of bond pads (403) coupled to, for example, the electrical traces (FIGS. 1 and 2, 105), in order to electrically couple the multiplexer (102) to the fluid reservoir (101). Thus, in one example, the multiplexer is located off the cartridge (402), and may be located, for example, on an integrated circuit of the electronic device (401). The print reservoir (101) contains the fluid (110) used to form the outcome of the print job. In one example, the processing device (108) may be located in the electronic device (401), and is used to instruct the fluid reservoir (101) and the multiplexer (102) to determine the level of fluid (110) within the fluid reservoir (101) and a number of properties of the fluid (110). In another example, the processing device (108) may be located on the cartridge (402), and may be used to relay data processed by the processing device (108) to the electronic device (401).

Figure 5:
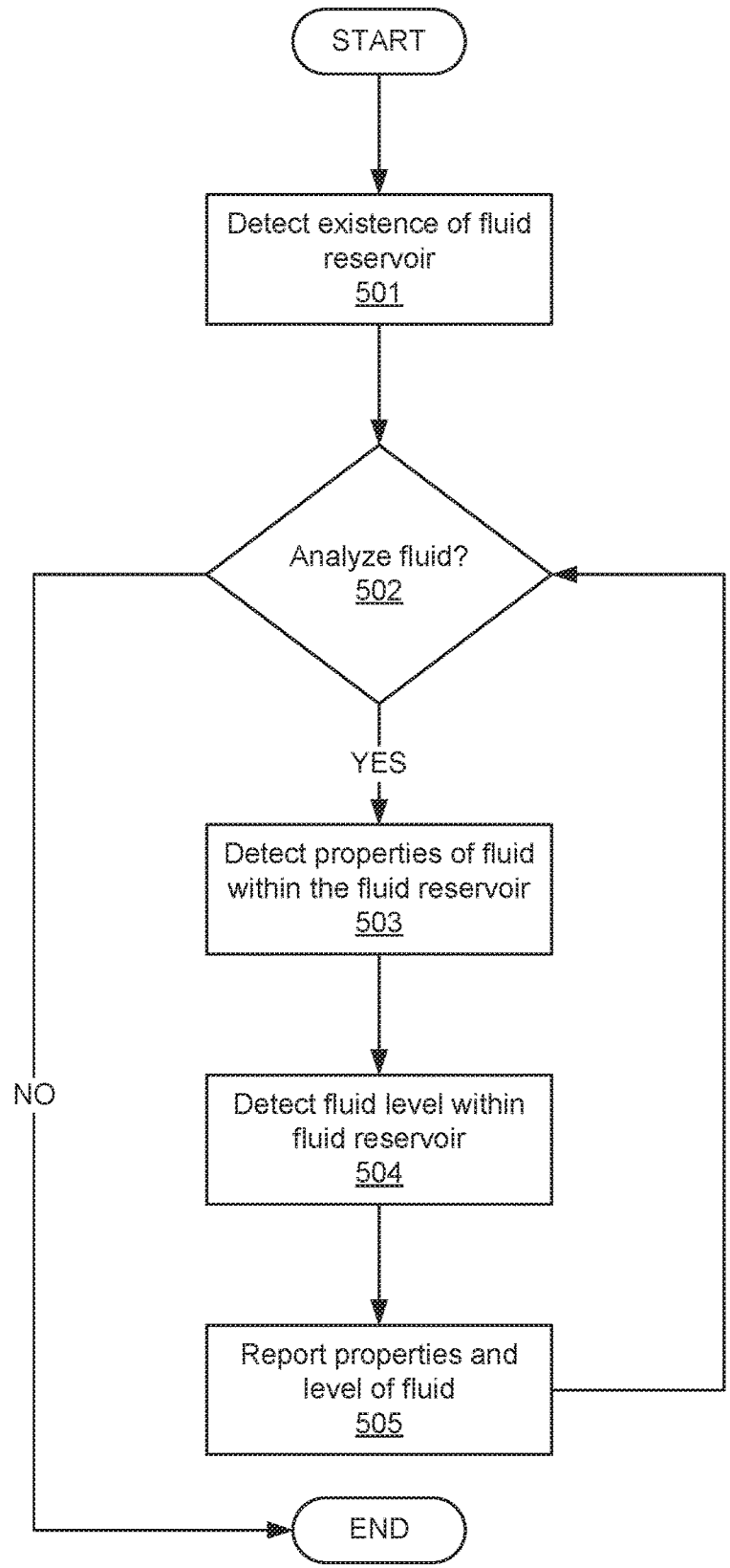
FIG. 5 is a flowchart depicting a method of detecting fluid within a fluid reservoir, according to one example of the principles described herein.

FIG. 5 is a flowchart depicting a method of detecting fluid (110) within a fluid reservoir (101), according to one example of the principles described herein. The method of FIG. 5 may begin by detecting (block 501) the existence of a fluid reservoir (101) within, for example, the electronic device (401) of FIG. 4. For example, the coupling of a fluid reservoir (101) to the electronic device (401) may occur when the electronic device (401) has consumed fluid (110) from a previous fluid reservoir (101). Detection of the fluid reservoir (101) may serve as a prompt to the electronic device (401) to perform an analysis of the fluid (110) within the fluid reservoir (101). In other examples, the fluid (110) within the fluid reservoir (101) may be analyzed at any point during the life of the fluid reservoir (101).

A determination (502) as to whether the fluid (110) within the fluid reservoir (101) is to be analyzed is made. If the fluid (110) is not to be analyzed (block 502, determination NO), the method of FIG. 5 may terminate. However, if the fluid (110) is to be analyzed (block 502, determination YES), a number of properties of the fluid (110) within the fluid reservoir (101) may be detected (block 503). Further, a level or amount of fluid (110) may be detected (block 504). When switching between determining (block 503) the properties of the fluid (110) and determining (block 504) the level of fluid (110), the multiplexer (102) switches the signals of each of one of the sensing electrodes (103) within the sensing electrode pairs between ground (109) and the processing device (108). For example, the electrical traces (105-2, 105-4, 105-6, 105-8) of sensing electrodes (103-2, 103-4, 103-6, 103-8) may be switched between ground (109) and the processing device (108). Specifically, in order to determine (block 503) the properties of the fluid (110), the electrical traces (105-2, 105-4, 105-6, 105-8) of sensing electrodes (103-2, 103-4, 103-6, 103-8) may be switched to ground (109). Conversely, in order to determine (block 504) the level of fluid (110), the electrical traces (105-2, 105-4, 105-6, 105-8) of sensing electrodes (103-2, 103-4, 103-6, 103-8) may be switched to the processing device (108). Thus, the level of fluid (110) within the fluid reservoir (101) may be detected with the multiplexer (102) in a first state, and the properties of the fluid (110) within the fluid reservoir (101) may be detected with the multiplexer (102) in a second state.

The properties and level or amount of fluid (110) within the fluid reservoir (101) may be reported (block 505). In one example, the properties and level or amount of fluid (110) within the fluid reservoir (101) may be reported (block 505) to the processing device (108) or the electronic device (401) in order to process the data describing the properties and level or amount of fluid (110) or display information to a user regarding the properties and level or amount of fluid (110). Further, in one example, the properties and vel or amount of fluid (110) within the fluid reservoir (101) may be independently detected. In this example, the processing device (108) may instruct the fluid reservoir (101) and the multiplexer (102) to determine the level of fluid (110) within the fluid reservoir (101) at different times and frequencies relative to the times and frequencies the processing device (108) may instruct the fluid reservoir (101) and the multiplexer (102) to determine the properties of the fluid (110).

The examples described herein describe the use of a direct current (DC) with the electrodes (103) in order to determine properties and level of the fluid (110) in the fluid reservoir (101). Although a direct current may be used in this way to determine the fluid level and properties in the reservoir (101), an alternating current (AC) may also be used similarly to detect the inductance of the fluid (110) in the reservoir (101) in a similar way. Thus, throughout the description herein, although the detection of the properties and fluid level in the reservoir (101) is couched in terms of a resistance, it is understood that the present examples may also be described in terms of a capacitance detected using an alternating current as well.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the processor (108) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The specification and figures describe a fluid reservoir. The fluid reservoir includes a number of electrode pairs disposed within the fluid reservoir. Each of the electrode pairs includes a number of sensing electrodes, and a number of electrical traces wherein the sensing electrodes are coupled to a respective one of the electrical traces. The fluid reservoir also includes a common electrode electrically coupled to a voltage source. A number of properties of a fluid within the fluid reservoir are detected by applying a voltage between the sensing electrodes in an electrode pair, and a level of the fluid within the fluid reservoir is detected by applying a voltage between the electrodes and the common electrode.

The fluid reservoir is an effective structure that provides both fluid level and fluid property sensing. When used for fluid level sensing, the fluid reservoir may reduce or eliminate false signals that may otherwise be obtain when a fluid capillary effect creates a meniscus along a number of sides of the fluid reservoir. Further, the fluid reservoir is less expensive since the sensing signal output is a resistance, and no complicated RF frequency range sensing circuit or ASIC support is utilized. Further, a combination of MID LDS and exposed sensing electrodes used for DC resistance measurements, along with the use of electrophoresis and electrical fields provide enhanced sensitivity for sensing and the capability to distinguish between pigment inks or other fluid differentiation properties.

The preceding description has been presented to illustrate and describe examples of the principles described. This description is not intended to be exhaustive or to limit these principles to any precise form disclosed. Many modifications and variations are possible in light of the above teaching.

What is claimed is:

1. A fluid reservoir comprising:
   a number of electrode pairs disposed within the fluid reservoir, wherein each of the electrode pairs comprises a number of sensing electrodes;
   a number of electrical traces, wherein the sensing electrodes are coupled to a respective one of the electrical traces;
   a common electrode electrically coupled to a voltage source;
   wherein:
   a number of properties of a fluid within the fluid reservoir are detected by applying a voltage between the sensing electrodes in an electrode pair; and
   a level of the fluid within the fluid reservoir is detected by applying a voltage between the electrodes and the common electrode; and
   a signal processing device to:
   process signals resulting from the voltage between the sensing electrodes in the electrode pair with a multiplexer in a first state to determine the properties of the fluid, the multiplexer being coupled to the sensing electrodes via the electrical traces; and
   process signals resulting from the voltage between the electrodes and the common electrode with the multiplexer in a second state to determine the level of the fluid within the fluid reservoir.

2. The fluid reservoir of claim 1, wherein the fluid reservoir comprises an array of the electrode pairs comprising a plurality of the electrode pairs.

3. The fluid reservoir of claim 1, wherein a location of the number of electrode pairs within the fluid reservoir define a corresponding number of levels of fluid within the fluid reservoir.

4. The fluid reservoir of claim 1, wherein a positioning of the number of electrode pairs within the array of electrode pairs defines a granularity of fluid level detection.

5. The fluid reservoir of claim 1, wherein the sensing electrodes, the common electrode; and the electrical traces are integrated into a housing of the fluid reservoir.

6. A fluid analysis system comprising:
   an electrode array disposed along a gravitationally oriented side of a fluid reservoir, the electrode array comprising:
   a number of sensing electrodes electrically arranged in pairs along the side of the fluid reservoir, each pair of sensing electrodes being located at a number of discrete fluid levels within the fluid reservoir; and
   a common electrode located below the sensing electrodes and coupled to a voltage source,
   a multiplexer electrically coupled to each of the sensing electrodes via a number of traces; and
   a signal processing device to process signals received by the electrodes via the multiplexer;
   wherein:
   a number of properties of a fluid within the fluid reservoir are detected by applying a voltage between the sensing electrodes of at least one of the electrode pairs with the multiplexer in a first state, and
   a level of the fluid within the fluid reservoir is detected by applying a voltage between the sensing electrodes and the common electrode with the multiplexer in a second state.

7. The fluid analysis system of claim 6, wherein applying the voltage between the sensing electrodes of at least one of the electrode pairs creates an electrical field between the at least one electrode pair to detect the properties of the fluid via electrophoresis.

8. The fluid analysis system of claim 6, wherein the signal processing device processes the signals received by the sensing electrodes based on the state of the multiplexer.

9. The fluid analysis system of claim 6, wherein a location of the number of sensing electrode pairs within the reservoir define a corresponding number of levels of fluid within the fluid reservoir.

10. The fluid analysis system of claim 6, wherein the number of sensing electrodes pairs within the electrode array defines a granularity of fluid level detection.

11. The fluid analysis system of claim 6, wherein the sensing electrodes, the common electrode, and the traces are integrated into the fluid reservoir using a laser direct structuring process.

12. The fluid analysis system of claim 6, wherein the sensing electrodes, the common electrode, and the traces are integrated into the fluid reservoir using a three-dimensional printing process.

13. A printing fluid container comprising:
a voltage source;
a common electrode coupled to the voltage source;
an electrode array disposed along a gravitationally oriented side of a fluid reservoir, the electrode array comprising a number of sensing electrodes electrically arranged in pairs along the side of the fluid reservoir, each pair of sensing electrodes being located at a number of discrete fluid levels within the fluid reservoir;
a multiplexer electrically coupled to each of the sensing electrodes; and
a signal processing device to process signals received by the electrodes via the multiplexer,
wherein a number of properties of a fluid within the printing fluid container are detected by applying a voltage between at least one pair of sensing electrodes with the multiplexer in a first state to form a number of electrical fields between the at least one pair of sensing electrodes;
wherein a level of the fluid within the fluid reservoir is detected by applying a voltage between the sensing electrodes and the common electrode with the multiplexer in a second state.

* * * * *